United States Patent [19]
Liu et al.

[11] Patent Number: 5,809,173
[45] Date of Patent: Sep. 15, 1998

[54] METHOD AND APPARATUS FOR IMPROVED VIDEO DECOMPRESSION USING PREVIOUS FRAME DCT COEFFICIENTS

[75] Inventors: Yi Liu; Michael R. Tucker; Geoffrey S. Strongin, all of Austin, Tex.

[73] Assignee: Advanced Micro Devices, Inc., Sunnyvale, Calif.

[21] Appl. No.: 424,739

[22] Filed: Apr. 18, 1995

[51] Int. Cl.⁶ .............. G06K 9/36; G06K 9/46; H04N 7/12

[52] U.S. Cl. .......... 382/233; 382/236; 382/238; 382/250; 348/420

[58] Field of Search .................. 382/233, 236, 382/238, 250; 348/420

[56] References Cited

U.S. PATENT DOCUMENTS

| | | | |
|---|---|---|---|
| 5,150,210 | 9/1992 | Hoshi et al. | 358/135 |
| 5,150,432 | 9/1992 | Ueno et al. | 382/250 |
| 5,227,878 | 7/1993 | Puri et al. | 358/136 |
| 5,239,308 | 8/1993 | Keesen | 341/67 |
| 5,247,363 | 9/1993 | Sun et al. | 358/167 |
| 5,347,308 | 9/1994 | Wai | 348/420 |
| 5,353,062 | 10/1994 | Maeda | 348/412 |
| 5,369,438 | 11/1994 | Kim | 348/402 |
| 5,379,351 | 1/1995 | Fandrianto et al. | 382/250 |
| 5,386,232 | 1/1995 | Golin et al. | 348/391 |
| 5,400,075 | 3/1995 | Savatier | 348/384 |
| 5,410,553 | 4/1995 | Choon | 371/31 |
| 5,428,396 | 6/1995 | Yagasaki et al. | 348/416 |
| 5,446,492 | 8/1995 | Wolf et al. | 348/192 |
| 5,497,434 | 3/1996 | Wilson | 382/232 |
| 5,504,530 | 4/1996 | Obikane et al. | 348/420 |
| 5,515,388 | 5/1996 | Yagasaki | 371/49.1 |
| 5,552,831 | 9/1996 | Machida et al. | 348/416 |
| 5,565,921 | 10/1996 | Sasaki et al. | 348/409 |
| 5,576,958 | 11/1996 | Kawakatsu et al. | 364/725 |
| 5,614,958 | 3/1997 | Shikakura | 348/616 |

FOREIGN PATENT DOCUMENTS

| | | | |
|---|---|---|---|
| 0 542 195 A2 | 5/1993 | European Pat. Off. | H04N 9/00 |
| 0 551 599 A1 | 7/1993 | European Pat. Off. | H04N 7/137 |
| 0 613 300 A2 | 8/1994 | European Pat. Off. | H04N 7/13 |

OTHER PUBLICATIONS

Dr. Richard Baker, "Standards Dominate Videoconferencing Implementations," Computer Design, Dec. 1994, pp. 66–70.

Stephen Ohr, "Digital Video Spearheads TV and Videoconferencing Applications", Computer Design, Dec. 1994, pp. 59–64.

Lawrence A. Rowe, et al., "MPEG Video in Software: Representation, Transmission, and Playback", High Speed Networking and Multimedia Computing, Symp. on Elec. Imaging Sci. & Tech., San Jose, CA, Feb., 1994, pp. 1–11.

Peng H. Ang, et al., "Video Compression Makes Big Gains", IEEE Spectrum, Oct. 1991, pp. 16–19.

(List continued on next page.)

*Primary Examiner*—Andrew W. Johns
*Assistant Examiner*—Monica S. Davis
*Attorney, Agent, or Firm*—Skjerven, Morrill, MacPherson, Franklin & Friel, L.L.P.; Andrew C. Graham

[57] ABSTRACT

An video decoder system, such as for use with MPEG video compression, uses a previous B-frame as an additional prediction source for the current B-frame. In one embodiment, a given block within a current B-frame "N" reuses IDCT result terms from the previous B-frame "N–1" if they are determined to be "similar enough" to the anticipated IDCT result terms which would otherwise need to be computed. For a given block, each of the "M" lowest-frequency DCT coefficients for B-frame "N" and B-frame "N–1" are respectively compared: if they differ by less than a similarity threshold value, then the IDCT result terms from the previous B-frame "N–1" are reused without further computation. The similarity threshold may be adaptively adjusted to reduce the computational burden of video decompression, while affording a gradual degradation of picture quality, rather than wholesale skipping of entire frames.

36 Claims, 5 Drawing Sheets

OTHER PUBLICATIONS

Andy C. Hung, et al., "A Comparison of Fast Inverse Discrete Cosine Transform Algorithms", Multimedia Systems, ©1994, pp. 204–217.

P1180/D1, "Draft Standard Specification for the Implementations of 8×8 Inverse Discrete Cosine Transform", May 29,1990, pp. 1–9.

ISO/IEC 11172–1, Information Technology–Coding of Moving Pictures and Associated Audio for Digital Storage Media at up to about 1,5 Mbit/s—Part 1: Systems, Aug. 1, 1993, pp. i–vi, 1–53.

ISO/IEC 11172–2, Information Technology–Coding of Moving Pictures and Associated Audio for Digital Storage Media at up to about 1,5 Mbit/s—Part 1: Video, Aug. 1, 1993, pp. i–ix, 1–112.

ISO/IEC 11172–3, Information Technology–Coding of Moving Pictures and Associated Audio for Digital Storage Media at up to about 1,5 Mbit/s—Part 1: Audio, Aug. 1, 1993, pp. i–vi, 1–150.

Kevin L. Gong, et al., "Parallel MPEG–1 Video Encoding", Report, University of California, Berkeley, Computer Science Division, 1994, pp. 1–14.

METHOD AND APPARATUS FOR IMPROVED VIDEO DECOMPRESSION USING PREVIOUS FRAME DCT COEFFICIENTS

CROSS-REFERENCE TO RELATED APPLICATIONS

This application is related to the commonly-assigned copending patent application entitled "Video Decoder Apparatus Using Non-reference Frame as an Additional Prediction Source and Method Therefor" by Yi Liu, Michael R. Tucker, and Geoffrey S. Strongin, Attorney Docket No. M-3231US, (Ser. No. 08/424,037, filed Apr. 18, 1995), the disclosure of which is incorporated herein by reference.

This application is also related to the commonly-assigned copending patent application entitled "Method of Adaptively Performing Motion Compensation in a Video Processing Apparatus" by Geoffrey S. Strongin, Yi Liu, and Michael R. Tucker, Attorney Docket No. M-3230US, (Ser. No. 08/424,019, filed Apr. 18, 1995), the disclosure of which is incorporated herein by reference.

This application is also related to the commonly-assigned copending patent application entitled "Method and Apparatus for Improved Video Decompression by Predetermination of IDCT Results Based Upon Image Characteristics", "by Geoffrey S. Strongin, Yi Liu, and Michael R. Tucker, Attorney Docket No. M-3280US, (Ser. No. 08/420,914, filed Apr. 18, 1995), the disclosure of which is incorporated herein by reference.

BACKGROUND OF THE INVENTION

The present invention relates to decompression and, more particularly, to decompression of video information.

Video information requires a large amount of storage space, therefore video information is generally compressed before it is stored. Accordingly, to display compressed video information which is stored, for example, on a compact disk read only memory (CD ROM), the compressed video information is decompressed to furnish decompressed video information. The decompressed video information is then communicated in a bit stream to a display. The bit stream of video information is generally stored in a plurality of memory storage locations corresponding to pixel locations on a display. The stored video information is generally referred to as a bit map. The video information representing a single screen of information on a display is called a frame. A goal of many video systems is to quickly and efficiently decode compressed video information to enable a motion video capability.

Standardization of recording media, devices and various aspects of data handling, such as video compression, is highly desirable for continued growth of this technology and its applications. One compression standard which has attained wide spread use for compressing and decompressing video information is the Moving Pictures Expert Group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 which is hereby incorporated by reference in its entirety.

Frames within the MPEG standard are divided into 16×16 pixel macroblocks. Each macroblock includes six 8×8 blocks: four luminance (Y) blocks, one chrominance red ($C_r$) block and one chrominance blue ($C_b$) block. The luminance blocks correspond to sets of 8×8 pixels on a display and control the brightness of respective pixels. The chrominance blocks to a large extent control the colors for sets of four pixels. For each set of four pixels on the display, there is a single $C_r$ characteristic and a single $C_b$ characteristic.

Figure 1:
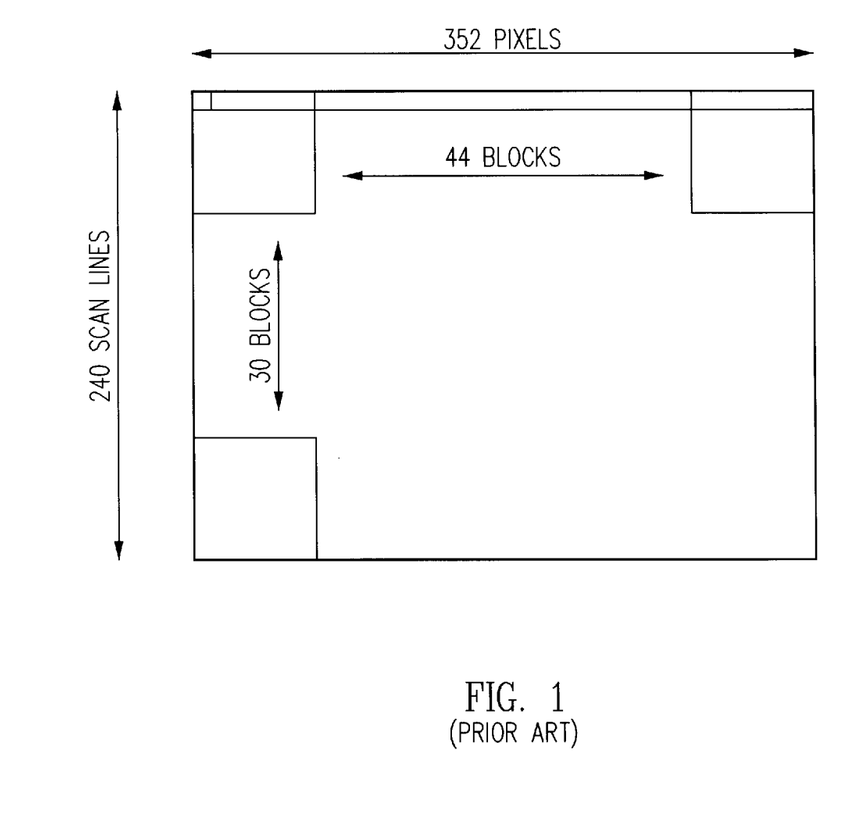
FIG. 1, labeled prior art, shows an arrangement of blocks of pixels on a display screen.

For example, referring to FIG. 1, labeled prior art, a frame presented by a typical display includes 240 lines of video information in which each line has 352 pixels. Accordingly, a frame includes 240×352=84,480 pixel locations. Under the MPEG standard, this frame of video includes 44 by 30 luminance blocks or 1320 blocks of luminance video information. Additionally, because each macroblock of information also includes two corresponding chrominance blocks, each frame of video information also includes 330 $C_r$ blocks and 330 $C_b$ blocks. Accordingly, each frame of video information requires 126,720 pixels or a total of 1,013,760 bits of bit-mapped storage space for presentation on a display.

Figure 2:
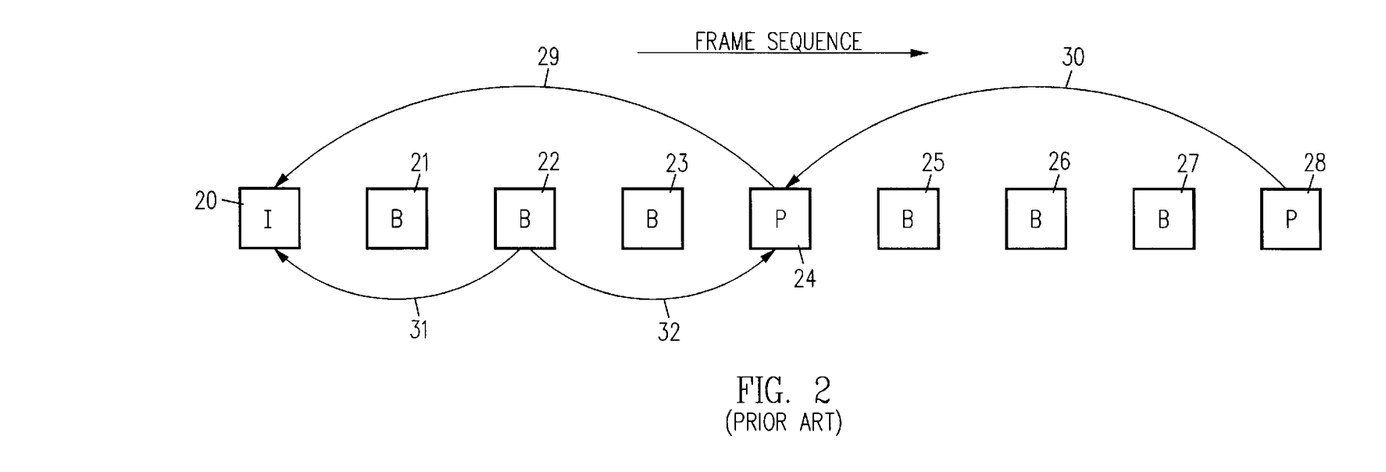
FIG. 2, labeled prior art, shows an example of an MPEG frame sequence.

There are three types of frames of video information which are defined by the MPEG standard: intra-frames (I frame), forward predicted frames (P frame) and bi-predicted frames (B frame). An example frame sequence is shown in FIG. 2, labelled prior art, which represents one of but many possible frame sequences supported by MPEG.

An I frame, such as I-frame 20, is encoded as a single image having no reference to any past or future frame (with one minor exception not important for this discussion). Each block of an I frame is encoded independently. Accordingly, when decoding an I frame, no motion processing is necessary. However, for the reasons discussed below, it is necessary to store and access I frames for use in decoding other types of frames.

A P frame, such as P-frame 24, is encoded relative to a past reference frame. A reference frame is a P or I frame. The past reference frame is the closest preceding reference frame. For example, P-frame 24 is shown as referring back to I-frame 20 by reference arrow 29, and thus, I-frame 20 is the past reference frame for P-frame 24. P-frame 28 is shown as referring back to P-frame 24 by reference arrow 30, and thus, P-frame 24 is the past reference frame for P-frame 28. Each macroblock in a P frame can be encoded either as an I macroblock or as a P macroblock. A P macroblock is stored as a translated 16×16 area of a past reference frame plus an error term. To specify the location of the P macroblock, a motion vector (i.e., an indication of the relative position of the macroblock in the current frame to the position of the translated area in the past reference frame) is also encoded. When decoding a P macroblock, the 16×16 area from the reference frame is offset according to a motion vector. The decoding function accordingly includes motion compensation, which is performed on a macroblock, in combination with error (IDCT) terms, which are defined on a block by block basis.

A B frame (e.g., B-frames 21, 22, 23, 25, 26, and 27) is encoded relative to the past reference frame and a future reference frame. The future reference frame is the closest proceeding reference frame (whereas the past reference frame is the closest preceding reference frame). Accordingly, the decoding of a B-frame is similar to that of a P frame with the exception that a B frame motion vector may refer to areas in the future reference frame. For example, B-frame 22 is shown as referring back to I-frame 20 by reference arrow 31, and is also shown as referring forward to P-frame 24 by reference arrow 32. For macroblocks that use both past and future reference frames, the two 16×16 areas are averaged and then added to blocks of pixel error terms. The macroblocks from the reference frames are offset according to motion vectors.

Frames are coded using a discrete cosine transform (DCT) coding scheme which transforms pixels (or error terms) into a set of coefficients corresponding to amplitudes of specific cosine basis functions. The discrete cosine transform is applied to image compression to decorrelate picture data prior to quantization. The DCT coefficients are further coded using variable length encoding. Variable length coding (VLC) is a statistical coding technique that assigns codewords to values to be encoded. Values having a high frequency of occurrence are assigned short codewords, and those having infrequent occurrence are assigned long codewords. On the average, the more frequent shorter codewords dominate so that the code string is shorter than the original data.

A variety of MPEG frame sequences are possible in addition to that shown (I-B-B-B-P-B-B-B-P-B-B-B-P-B-B-B-I- . . . ) in FIG. 2. Possible alternate sequences include: I-P-P-P-I-P-P-P-I-P-P-P- . . . ; I-B-B-P-B-B-PB-B-I- . . . ; I-I-I-I-I-I-I- . . . (known as full motion JPEG); and others. Each choice trades off picture fidelity against compression density against computational complexity.

The above described scheme using I, P, and B frames and motion vectors is often referred to as motion compensation. The pixel error terms are coded via the discrete cosine transform (DCT), quantization, and variable-length coding (VLC). Performing an inverse discrete cosine transform function (IDCT) is one of the most computationally intensive operations in many common video decompression methods and which requires extensive processor resources. Furthermore, such an operation must be performed to decode every block in the compressed video information. The IDCT function severely burdens the system processor when implemented in a general purpose processor system since this operation requires many additions and multiplications for each term of the 64-term block.

Systems unable to keep up with the computational demands of such a decompression burden frequently drop entire frames to resynchronize with a real time clock signal also encoded in the video stream. Otherwise, video signals would become out of synchronization with audio signals, and/or the video playback would "slow down" compared to the "real" speed otherwise intended. This is sometimes observable as a momentary freeze of the picture in the video playback, followed by sudden discontinuities or jerkiness in the picture. Consequently, a significant need exists for reducing the processing requirements associated with decompression methods.

SUMMARY OF THE INVENTION

In a typical video decoder, B frames are decoded by using prediction information from their respective past and future reference frames, as is called for by the specification of the compression method. However, there are usually significant similarities between adjacent B frames "N−1" and "N". Current decoders do not take advantage of these similarities, and thus recompute many pixel values which do not necessarily need to be recomputed.

It has been discovered that using a previous frame "N−1" as an additional prediction source for the current frame "N" advantageously reduces the computational burden of video decompression. Such decompression may be particularly burdensome when implemented on a general purpose processor system. IDCT result terms for a given block within the current frame "N" may reuse IDCT result terms from the previous frame "N−1" if they are "similar enough" and thus don't need to be recomputed. The "similarity threshold" may be adaptively adjusted to afford a gradual degradation of picture quality, rather than wholesale skipping of entire frames.

In one method embodiment especially suitable for implementation on a general purpose processor system for decoding compressed video information, a method for determining a plurality of IDCT result terms for a block within a frame "N" of a given type, in a sequence of video frames including a previous frame "N−1" of the given type, includes the steps of: decoding from the compressed video information a plurality of DCT coefficients for the block within frame "N"; comparing the plurality of DCT coefficients for the block within frame "N" to a plurality of DCT coefficients for a respective block within the previous frame "N−1", to generate a first condition when differing by less than a predetermined similarity threshold, and otherwise to generate a second condition; and determining a plurality of IDCT result terms for the block within frame "N", upon the first condition, by reusing a plurality of IDCT result terms for the respective block within the previous frame "N−1", and conversely upon the second condition, by an IDCT computation using the plurality of DCT coefficients for the block within frame "N".

In another embodiment for a system for decoding compressed video information, an apparatus for determining a plurality of IDCT result terms for a block within a frame "N" of a given type, in a sequence of video frames including a previous frame "N−1" of the given type, includes: a decoder circuit for decoding from the compressed video information a plurality of DCT coefficients for the block within frame "N"; a DCT coefficient buffer circuit for storing a plurality of DCT coefficients for a respective block within the previous frame "N−1"; a comparator circuit for comparing the plurality of DCT coefficients for the block within frame "N" to the plurality of DCT coefficients for the respective block within frame "N−1", for generating a first condition when differing by less than a predetermined similarity threshold, and otherwise for generating a second condition; an IDCT result term buffer circuit for storing a plurality of IDCT result terms for the respective block within frame "N−1", for determining a plurality of IDCT result terms for the block within frame "N" by reusing, upon the first condition, said plurality of IDCT result terms stored therewithin; and an IDCT circuit for determining, upon the second condition, the plurality of IDCT result terms for the block within frame "N", by computation using the plurality of DCT coefficients associated therewith, said IDCT circuit also for storing said plurality of IDCT result terms into the IDCT result term buffer circuit and for storing said plurality of DCT coefficients into the DCT coefficient buffer circuit, thereby overwriting the plurality of IDCT result terms and overwriting the plurality of DCT coefficients corresponding to the respective block within frame "N−1" and respectively previously stored therewithin.

DETAILED DESCRIPTION

The following description is intended to be illustrative of the invention and should not be taken to be limiting.

Figure 3:
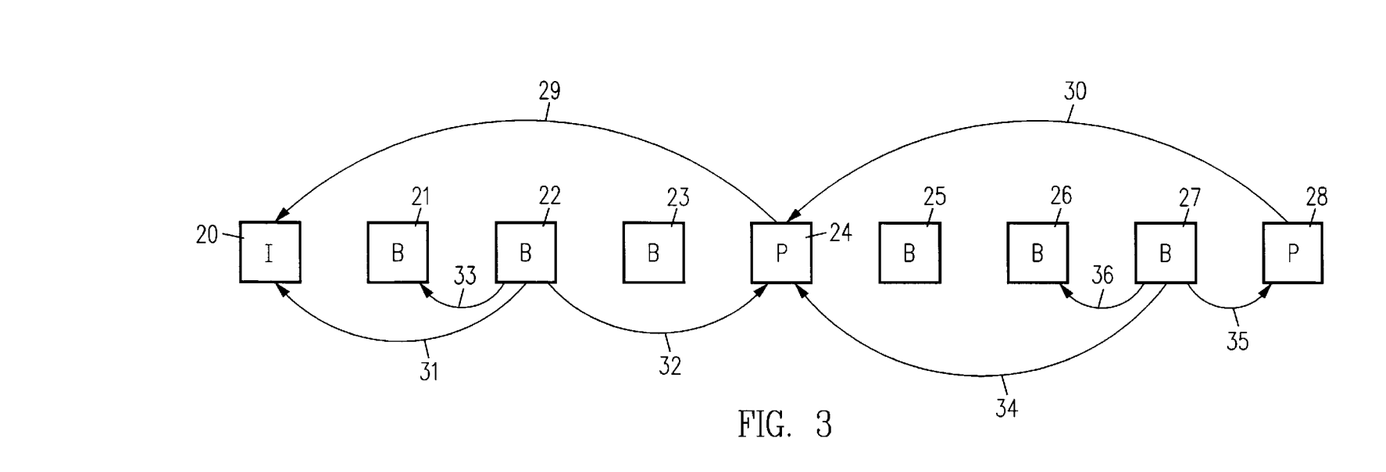
FIG. 3 shows an example of the MPEG frame sequence shown in FIG. 2, with indications of decoding performance enhancements in accordance with one embodiment of the current invention.

FIG. 3 shows the frame sequence as previously shown in FIG. 2, but with additional prediction sources noted in accordance with the current invention. B-frame 22 is shown as referring back to I-frame 20 by reference arrow 31, and referring forward to P-frame 24 by reference arrow 32, as noted previously. In addition, however, B-frame 22 is shown as "referring back" to previous B-frame 21 by reference arrow 33, indicating the use of B-frame 21 as an additional prediction source for B-frame 22. Likewise, B-frame 27 is shown as referring back to P-frame 24 by reference arrow 34, referring forward to P-frame 28 by reference arrow 35, and now "referring back" to previous B-frame 26 by reference arrow 36. The manner in which a previous B-frame may be used as a prediction source is described below, and which is accomplished while making no change in the MPEG B-frame encoding.

In one embodiment, an IDCT result term buffer is initialized with IDCT result terms already determined for the previous B-frame. IDCT result terms for a given block within the current B frame "N" simply reuse the IDCT result terms from the previous B-frame "N−1" if the DCT coefficients for the block within the current B-frame "N" are found to be "similar enough" to the DCT coefficients for the respective block within the previous B-frame "N−1". If, however, the DCT coefficients are found to be different enough (meaning that the respective IDCT result terms will also be different enough), new computations are executed which determine the IDCT result terms, which are then stored within the IDCT result term buffer, thus overwriting the initialized IDCT result terms from the previous B-frame "N−1". A variety of methods may be employed for the similarity test just described for each block. For example, for a given block, each term within the plurality of DCT coefficients for both B-frames may be compared: if they differ by less than a similarity threshold value, then the IDCT result terms from the previous B-frame may be used without further computation, for they are already initialized into the IDCT result term buffer and available to the remainder of the system. Conversely, if the difference is greater than the similarity threshold, then the system proceeds to perform an IDCT computation. Such an IDCT computation, if performed at all, is performed consistent with the MPEG specification, but may be performed in a variety of optimized fashions, as is disclosed in copending Application Ser. No. 08/423,914, Attorney Docket No. M-3280US, previously referenced herein. Such a similarity threshold may be adaptively adjusted to allow for a decrease in processor requirements while affording a gradual degradation of picture quality, rather than merely skipping entire frames, or may be staticly selected based upon a target frame rate anticipated for the system.

A conceptual system for decompressing video information as described above is shown schematically in FIG. 4. Video system 40 includes input stream decoding portion 42, motion decoding portion 44, adder 46, frame buffer 58, and display device 48. Input stream decoding portion 42 receives a stream of compressed video information and provides blocks of staticly decompressed video information (IDCT result terms) to adder 46. Motion decoding portion 44 receives motion information and provides motion-compensated pixels to adder 46. Adder 46 receives the staticly decompressed video information and the motion-compensated pixels and provides decompressed pixels to frame buffer 58, which then provides the information to display 48.

Figure 4:
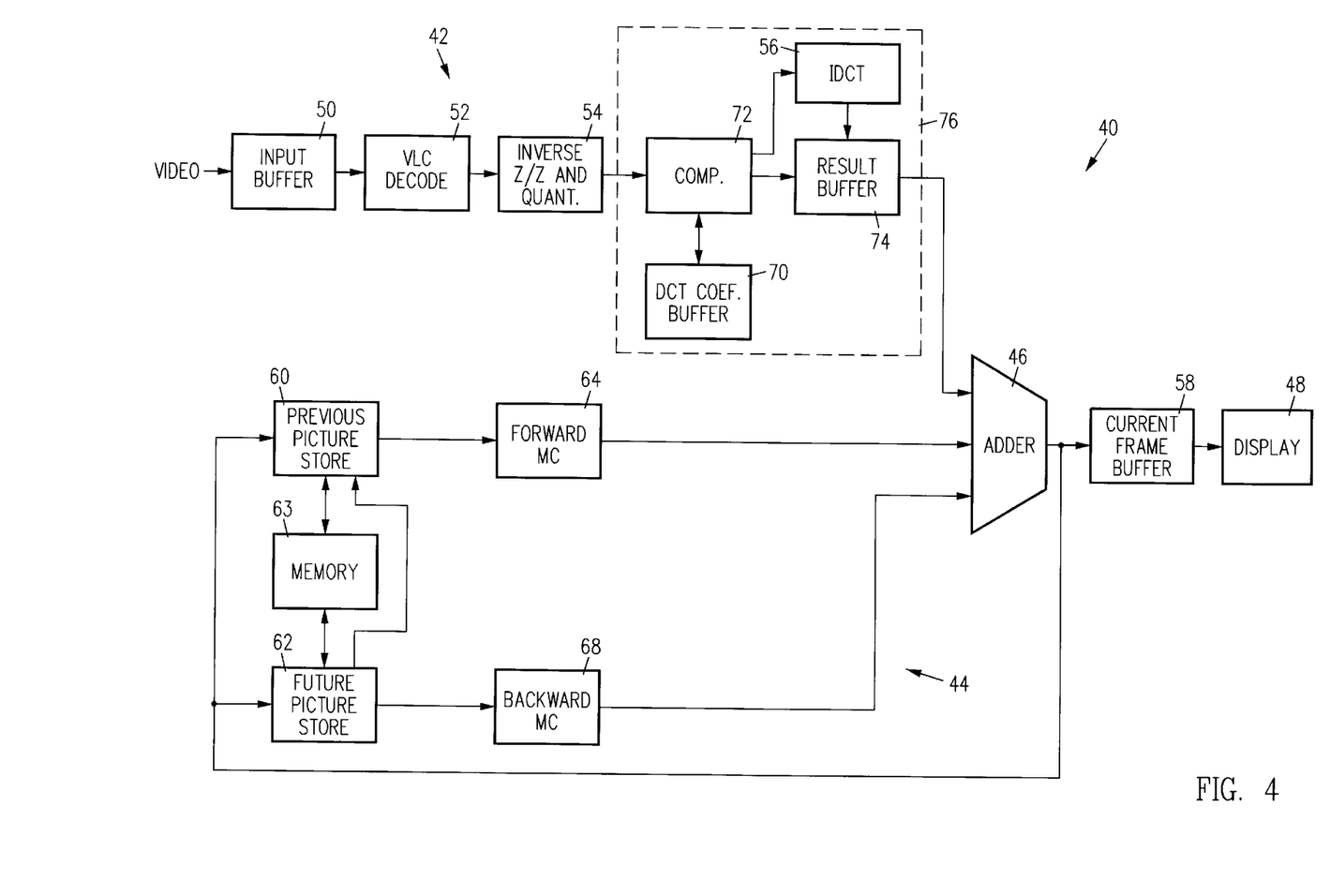
FIG. 4 shows a conceptual block diagram of a video decoder system in accordance with the present invention.

Input stream decoding portion 42 includes input buffer 50, variable length coding (VLC) decoder 52, inverse zig-zag and quantizer circuit 54, inverse discrete cosine transform (IDCT) circuit 56, DCT coefficient buffer circuit 70, comparator circuit 72, and IDCT result term buffer circuit 74. Motion decoding portion 44 includes previous picture store circuit 60, future picture store circuit 62, memory 63, forward motion compensation circuit 64 and backward motion compensation circuit 68. Frame buffer 58 captures a display frame as it is decoded and assembled macroblock by macroblock, and allows information provided by adder 46 to be rasterized prior to display by display device 48.

Input stream decoding portion 42 provides staticly decompressed pixels (such as pixel error terms) to adder 46 on a block by block basis. Additionally, forward motion compensation circuit 64 and backward motion compensation circuit 68 of motion decoding portion 44 provide motion-compensated pixel values to adder 46 on a macroblock by macroblock basis. Adder 46 provides display pixel values to frame buffer 58 on a macroblock by macroblock basis until a frame is completed, which is then provided to previous picture store circuit 60 (in the case of an I or P past reference frame) and to future picture store circuit 62 (in the case of an I or P future reference frame).

In operation, input buffer 50 receives a compressed video signal from a video signal source such as a CD ROM (not shown); the compressed video signal is provided as a stream of compressed video information. Input buffer 50 buffers this compressed video signal to compensate for the speed which the signal is provided by the video source. This buffered compressed video signal is provided to VLC decoder 52 which decodes the variable length coded portion of the compressed signal to provide a variable length decoded signal to inverse zig-zag and quantizer circuit 54 which decodes the variable length decoded signal to provide a zig-zag decoded and dequantized signal. The inverse zig-zag and quantization compensates for the fact that while a compressed video signal is compressed in a zig-zag fashion, the zig-zag decoded and dequantized signal is provided to inverse DCT circuit 56 as sequential blocks of information. Accordingly, this zig-zag decoded and dequantized signal provides blocks to macroblocks which are in the order required for raster scanning across display 58.

This zig-zag decoded and dequantized signal is then provided to IDCT section 76 which determines the IDCT result terms based upon the DCT coefficients for the block. IDCT section 76 may perform an inverse discrete cosine transform on the zig-zag decoded and dequantized video signal, or may reuse IDCT result terms from a respective block within a previous frame, on a block by block basis to provide statically decompressed pixel values or error terms. Such pixel values may be used to present a static image on display 58 or may be used as a frame within a sequence of frames for presentation of a motion image on display 58.

The statically decompressed pixel values are provided to adder 46 which, if the block does not include any motion information (e.g., I frames) are then provided unchanged to frame buffer 58. However, for video signals which include motion information (e.g., certain B frames and P frames), adder 46 adds the decompressed pixel error terms to the forward motion compensation and backward motion compensation outputs from motion decode portion 44 to generate the display pixel values which are provided to frame buffer 58 and then to display 48. More specifically, forward motion vectors are used to translate pixels in previous picture store circuit 60 and backward motion vectors are used to translate pixels in future picture store circuit 62 and this information is added to the output provided by IDCT section 76.

For an I frame, on which no motion compensation is performed, the IDCT section 76 output provides the display pixel values directly for each block, which are transmitted through adder 46 to frame buffer 58 (for display), and which are also provided to previous picture store circuit 60. Previous picture store circuit 60 stores the blocks of video information in memory 63 for access in performing motion compensation on future frames of video information.

If the frame is a P frame, motion compensation may be performed by motion compensation portion 44. More specifically, previous frame information is accessed from memory 63 via previous picture store circuit 60. The previous picture information is then forward motion compensated by forward motion compensation circuit 64 to provide a forward motion-compensated macroblock of pixel values. Then the pixel error terms provided by IDCT section 76 are added with the forward motion-compensated pixel values to provide a macroblock of the P frame. After all macroblocks are similarly computed, the P frame is both transferred to display 48 and to memory 63 via future picture store circuit 62 for future use.

If the frame is a B frame, then motion compensation is performed and motion compensation portion 44 is used. More specifically, previous picture information and future picture information is accessed from memory 63 via previous picture store circuit 60 and future picture store circuit 62. The previous picture information is then forward motion compensated by forward motion compensation circuit 64 to provide a forward motion-compensated pixel macroblock. Additionally, the future picture information is backward motion compensated by backward motion compensation circuit 68 to provide a backward motion-compensated pixel macroblock. The averaging of these two macroblocks yields a bidirectional motion-compensated macroblock. Next, pixel error terms which are provided by IDCT section 76 are added to the bidirectional motion-compensated macroblock to provide a macroblock of pixel values for the B frame, which is then stored within frame buffer 58. After all macroblocks are similarly computed, the completed B-frame of display pixel values is transferred to display 48.

IDCT section 76 determines the IDCT result terms for each block within a frame based upon the DCT coefficients for that block. A zig-zag decoded and dequantized signal, consisting of a block of DCT coefficients, is presented to comparator 72. The DCT coefficients for the corresponding block within the previous frame are stored within DCT coefficient buffer 70 and are also available to the comparator 72. If the comparator 72 determines that the DCT coefficients are similar enough, the IDCT section 76 reuses the IDCT result terms from the previous frame, which are stored within IDCT result term buffer circuit 74, and which are passed on to the adder 46. Conversely, however, if the two sets of DCT coefficients are not similar enough, then inverse DCT circuit 56 computes the IDCT result terms using the DCT coefficients themselves in accordance with any of several suitable algorithms, as previously discussed. These IDCT result terms are also then stored within IDCT result term buffer circuit 74 and which are passed on to the adder 46, and the corresponding DCT coefficients are stored within the DCT coefficient buffer circuit 70.

Figure 5:
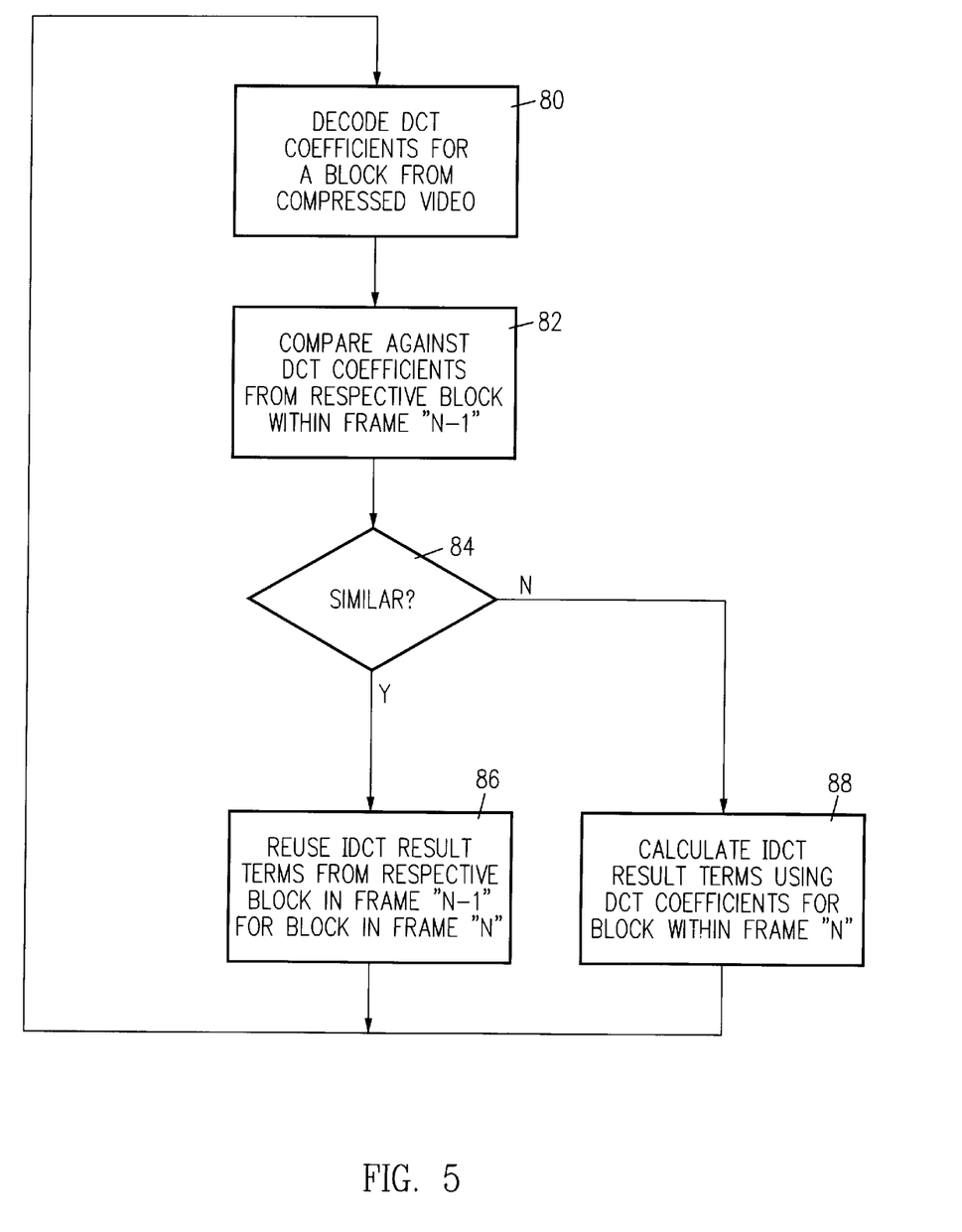
FIG. 5 shows an operational flowchart of the embodiment of a video decoder system as shown in FIG. 4.

An operational flowchart of IDCT section 76 is shown in FIG. 5. At step 80 the video information is decoded to produce the DCT coefficients for a given block. At step 82 these DCT coefficients are compared against the DCT coefficients from a corresponding block within the previous frame "N−1". At step 84 the result of the comparison is tested: if similar, flow proceeds to step 86, which reuses the IDCT result terms from the respective block within the previous frame "N−1" for the block within frame "N", at which point flow returns to step 80 to decode the DCT coefficients for the next block of frame "N". If, however, at step 84 the comparison is not similar, then flow proceeds to step 88, which calculates the IDCT result terms using the DCT coefficients for the block within the frame "N".

Figure 6:
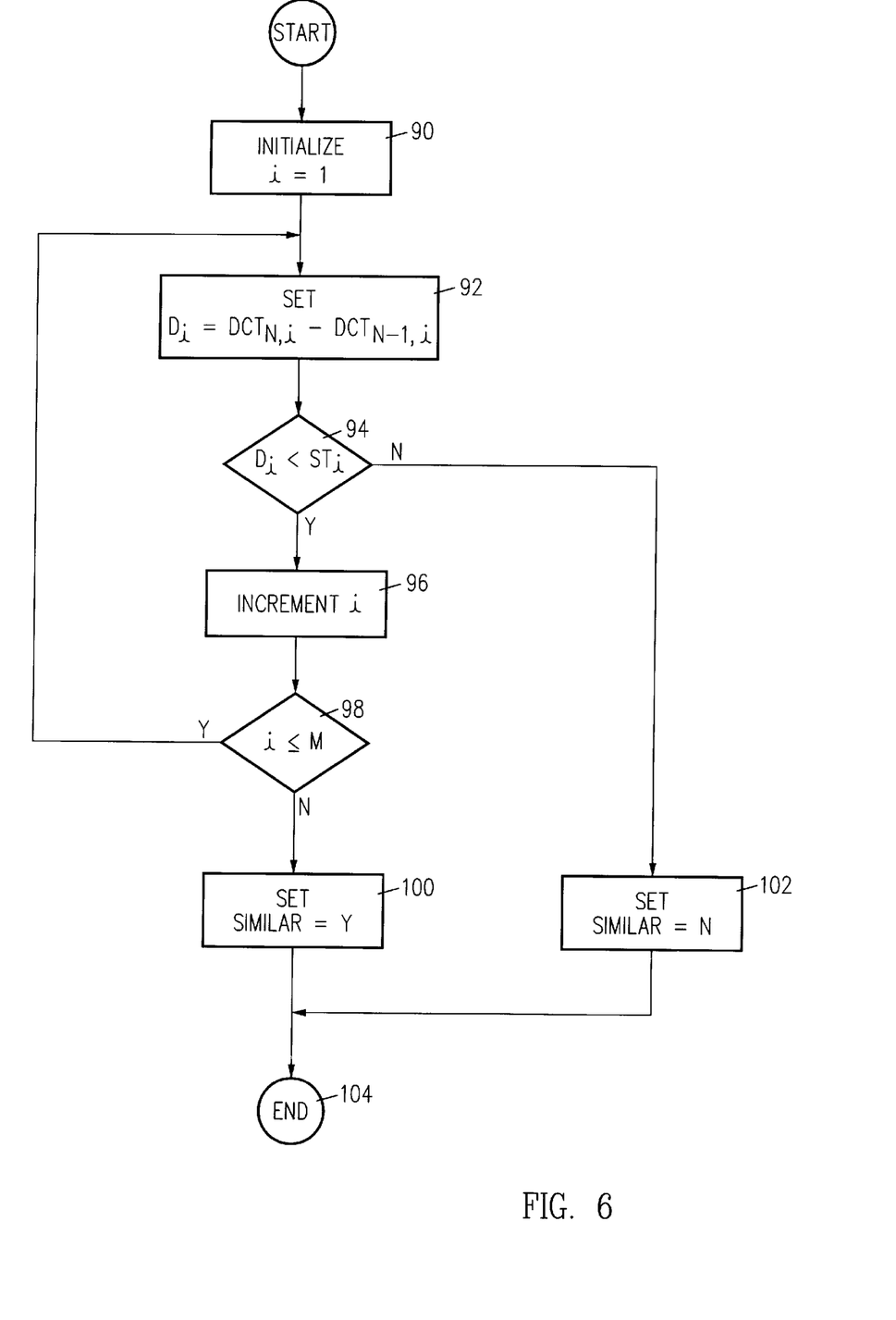
FIG. 6 shows an operational flowchart detail for one step of the operational flowchart as shown in FIG. 5.

FIG. 6 is a flowchart illustrating greater detail of a preferred comparison method useful for step 82 of FIG. 5. Starting at step 90, a local variable I is initialized to 1. Then, at step 92, a difference term $D_I$ is calculated as the difference between $DCT_I$ for frame "N" and $DCT_I$ for frame "N−1". In other words, the $I^{th}$ terms of both DCT coefficients are subtracted to yield an $I^{th}$ difference term. At step 94 this difference term, $D_I$, is compared against a similarity term, $ST_I$, selected for the $I^{th}$ DCT terms. If $D_I<ST_I$, then flow proceeds to step 96, which increments I. Step 98 then checks I against a value M, and if not yet exceeding M, flow returns to step 92 for calculation of the next difference term. However, at step 94, if the comparison fails, then at step 102 the variable SIMILAR is set to NO, and the comparison ended at step 104. Referring back to step 98, if the increment of I exceeds M, then flow proceeds to step 100, which sets the variable SIMILAR to YES and ends at step 104.

For MPEG, there are 64 DCT coefficients in each block. Consequently, this comparison may test all 64 DCT coefficients. However, a preferred test only tests the lowest frequency DCT coefficients, because in MPEG the higher frequency DCT coefficients are frequently equal to zero for a given block. Thus, M may be set to limit the comparison to the "M" lowest frequency DCT coefficients of the 64 total coefficients for each block. For example, for B-frames a value of "M"=5 may advantageously be used.

The similarity threshold terms, $ST_I$, may be individually set for each respective DCT coefficient, to allow for greater or lesser similarity for each of the DCT coefficients actually compared. Conversely, a single similarity threshold value, $ST_{ALL}$, may be used at step 94 for comparing each difference term against a fixed similarity threshold.

Both the value of M and the values of the similarity threshold terms, $ST_I$ may be adaptively adjusted to vary the computational burden to the video decoder system, and may be, for example, adjusted based upon a desired versus achieved frame rate of the video decoder system.

To be able to compare DCT coefficients for each block within a frame decoded from the video stream against the DCT coefficients for the respective block within a previous frame requires an amount of additional storage, provided by DCT coefficient buffer circuit 70. Likewise, such additional storage is also required to store the IDCT result terms for each block. Such additional storage requirements may be accepted because of the computational savings achieved by not having to calculate the IDCT result terms for each block every time, especially when implemented on a general purpose processor system. For example, the additional memory required for storing the DCT coefficients may be reduced by storing only the "M" lowest frequency coefficients, corresponding to those coefficients actually tested in the comparison step detailed in FIG. 6, rather than storing all 64 coefficients for each block. For example, when "M"=5, DCT coefficient buffer circuit 70 requires 16 bits×5 coefficients×1320 blocks for storing the DCT coefficients for an entire frame, or a total of 13,200 bytes. The IDCT result term buffer circuit 74 requires 8 bits×64 result terms×1320 blocks for storing the IDCT result terms for an entire frame, or a total of 675,840 bytes. For B-frames, which typically contain far fewer IDCT encoded blocks per frame, such memory requirements dramatically reduce.

One especially significant advantage of this invention is a reduction in required computational power, combined with a gradual degradation of picture quality. Systems unable to keep up with the computational demands of such a decompression burden frequently drop entire frames to resynchronize with a real time clock signal also encoded in the video stream. Otherwise, video signals would become out of synchronization with audio signals, and/or the video playback would "slow down" compared to the "real" speed otherwise intended. This is sometimes observable as a momentary freeze of the picture in the video playback, followed by sudden discontinuities or jerkiness in the picture. By monitoring the achieved frame rate versus the desired frame rate, the similarity threshold may be adaptively adjusted to achieve sufficient reduction in computational burden to allow the system to reach the desired frame rate. If the desired frame rate is not being achieved, the threshold for similarity may be raised so that more IDCT result terms are reused and the computational requirements are reduced. Conversely, the similarity threshold may be statically selected based upon a target frame rate expected to be achieved by the system.

OTHER EMBODIMENTS

Other embodiments are within the following claims. For example, the various modules or portions of video system 40 may be provided in either hardware or software or a combination thereof. For example, video system 40 may be provided by software that is designed to be executed on a general purpose processor system. For example, IDCT section 76 may be configured as a microprocessor which is adapted to execute an inverse DCT algorithm. Conversely, video system 40 may be implemented in a more traditional special purpose hardware system, optimized to perform the described functions typically using dedicated hardware units.

While the present invention is set forth with reference to a B-frame and a previous B-frame, the advantages are equally present for P-frames and I-frames, whenever a block is decoded which has similar DCT coefficients to a respective block in a previous frame.

Also, for example, while the present invention is set forth with reference to MPEG video compression, other similar compression schemes are equally contemplated and are intended to fall within the scope of the following claims.

What is claimed is:

1. In a system for decoding compressed video information, a method for determining a plurality of IDCT result terms for a block within a frame "N" of a given type, in a sequence of video frames including a previous frame "N−1" of the given type, comprising the steps of:

decoding from the compressed video information a plurality of DCT coefficients for the block within frame "N";

comparing the plurality of DCT coefficients for the block within frame "N" to a plurality of DCT coefficients for a respective block within the previous frame "N−1", to generate a first condition when differing by less than a predetermined similarity threshold, and otherwise to generate a second condition; and determining a plurality of IDCT result terms for the block within frame "N", upon the first condition, by reusing a plurality of IDCT result terms for the respective block within the previous frame "N−1", and conversely upon the second condition, by an IDCT computation using the plurality of DCT coefficients for the block within frame "N".

2. A method as in claim 1 wherein the comparing step comprises:

comparing only a subset of "M" lowest frequency DCT coefficients from each of the respective pluralities of DCT coefficients; and ignoring, for the comparing step, any remaining DCT coefficients from each of the respective pluralities of DCT coefficients.

3. A method as in claim 1 wherein the comparing step comprises:

comparing each of the plurality of DCT coefficients for the block within frame "N" with a corresponding one of a plurality of DCT coefficients for a respective block within the previous frame "N−1", to generate a corresponding difference term; and generating the first condition when each of the difference terms is less than a predetermined similarity threshold, and otherwise generating the second condition.

4. A method as in claim 3 wherein the comparing step further comprises:

comparing only a subset of "M" lowest frequency DCT coefficients from each of the respective pluralities of DCT coefficients; and ignoring, for the comparing step, any remaining DCT coefficients from each of the respective pluralities of DCT coefficients.

5. A method as in claim 1 wherein the comparing step comprises:

comparing each of the plurality of DCT coefficients for the block within frame "N" with a corresponding one of a plurality of DCT coefficients for a respective block within the previous frame "N−1", to generate a corresponding difference term; and generating the first condition when each of the difference terms is less than a corresponding similarity threshold term, and otherwise generating the second condition.

6. A method as in claim 5 wherein the comparing step further comprises:

comparing only a subset of "M" lowest frequency DCT coefficients from each of the respective pluralities of DCT coefficients; and ignoring, for the comparing step, any remaining DCT coefficients from each of the respective pluralities of DCT coefficients.

7. A method as in claim 1 wherein the predetermined similarity threshold is adaptively adjusted based upon an achieved frame rate relative to a desired frame rate of the system.

8. A method as in claim 1 wherein the predetermined similarity threshold is statically selected based upon a target frame rate of the system.

9. A method as in claim 1 wherein the compressed video information comprises MPEG compressed video information.

10. A method as in claim 9 wherein a frame of the given type comprises a B-frame.

11. A method as in claim 9 wherein a frame of the given type comprises a P-frame.

12. A method as in claim 9 wherein a frame of the given type comprises an I-frame.

13. A method as in claim 1 wherein the system comprises a general purpose processor system.

14. A method as in claim 1 wherein the system comprises a special purpose hardware system.

15. In a system for decoding compressed video information, an apparatus for determining a plurality of IDCT result terms for a block within a frame "N" of a given type, in a sequence of video frames including a previous frame "N−1" of the given type, comprising:

a decoder circuit for decoding from the compressed video information a plurality of DCT coefficients for the block within frame "N";

a DCT coefficient buffer circuit for storing a plurality of DCT coefficients for a respective block within the previous frame "N−1";

a comparator circuit for comparing the plurality of DCT coefficients for the block within frame "N" to the plurality of DCT coefficients for the respective block within frame "N−1", for generating a first condition when differing by less than a predetermined similarity threshold, and otherwise for generating a second condition;

an IDCT result term buffer circuit for storing a plurality of IDCT result terms for the respective block within frame "N−1", for determining a plurality of IDCT result terms for the block within frame "N" by reusing, upon the first condition, said plurality of IDCT result terms stored therewithin; and an IDCT circuit for determining, upon the second condition, the plurality of IDCT result terms for the block within frame "N", by computation using the plurality of DCT coefficients associated therewith, said IDCT circuit also for storing said plurality of IDCT result terms into the IDCT result term buffer circuit and for storing said plurality of DCT coefficients into the DCT coefficient buffer circuit, thereby overwriting the plurality of IDCT result terms and overwriting the plurality of DCT coefficients corresponding to the respective block within frame "N−1" and respectively stored previously therewithin.

16. An apparatus as in claim 15 wherein the comparator circuit is adapted to compare only a subset of "M" lowest frequency DCT coefficients from each of the respective pluralities of DCT coefficients; and is further adapted to ignore any remaining DCT coefficients from each of the respective pluralities of DCT coefficients.

17. An apparatus as in claim 15 wherein the comparator circuit is adapted to compare each of the plurality of DCT coefficients for the block within frame "N" with a corresponding one of a plurality of DCT coefficients for a respective block within the previous frame "N−1", to generate a corresponding difference term; and is further adapted to generate the first condition when each of the difference terms is less than a predetermined similarity threshold, and otherwise to generate the second condition.

18. An apparatus as in claim 15 wherein the comparator circuit is adapted to compare each of the plurality of DCT coefficients for the block within frame "N" with a corresponding one of a plurality of DCT coefficients for a respective block within the previous frame "N−1", to generate a corresponding difference term; and is further adapted to generate the first condition when each of the difference terms is less than a corresponding similarity threshold term, and otherwise to generate the second condition.

19. An apparatus as in claim 15 wherein the predetermined similarity threshold is adaptively adjusted based upon an achieved frame rate relative to a desired frame rate of the system.

20. An apparatus as in claim 15 wherein the predetermined similarity threshold is statically selected based upon a target frame rate.

21. An apparatus as in claim 15 wherein the compressed video information comprises MPEG compressed video information.

22. An apparatus as in claim 21 wherein a frame of the given type comprises a B-frame.

23. An apparatus as in claim 15 wherein the system comprises a general purpose processor system.

24. An apparatus as in claim 15 wherein the system comprises a special purpose hardware system.

25. In a system for decoding NPEG compressed video information, a method for determining a plurality of IDCT result terms for a block within a B-frame "N", in a sequence of video frames including a previous B-frame "N−1", comprising the steps of:

initializing the plurality of IDCT result terms for the block within the B-frame "N" with a previously determined plurality of IDCT result terms corresponding to the respective block within the B-frame "N−1";

decoding from the compressed video information a plurality of DCT coefficients for the block within the B-frame "N";

comparing the plurality of DCT coefficients corresponding to the block within the B-frame "N" to a plurality of DCT coefficients corresponding to a respective block within the previous B-frame "N−1";

reusing the initialized plurality of IDCT result terms for the block within the B-frame "N" if the respective pluralities of DCT coefficients associated with the respective blocks within the B-frame "N" and the B-frame "N−1" differ by less than a predetermined similarity threshold; and calculating the plurality of IDCT result terms for the block within the B-frame "N" if the respective pluralities of DCT coefficients associated with the respective blocks within the B-frame "N" and the B-frame "N−1" differ by more than a predetermined similarity threshold, by computation in a manner as directed by the plurality of DCT coefficients associated with the block within the B-frame "N", thereby over-writing the previously initialized plurality of IDCT result terms from the previous B-frame "N−1".

26. A method as in claim 25 wherein the predetermined similarity threshold is adaptively adjusted based upon an achieved frame rate relative to a desired frame rate of the system.

27. A method as in claim 25 wherein the predetermined similarity threshold is statically selected based upon a target frame rate.

28. A method as in claim 25 wherein the initializing step comprises reusing a buffer circuit containing the previously determined plurality of IDCT result terms corresponding to the respective block within the B-frame "N−1" and already stored therewithin.

29. In a system for decoding MPEG compressed video information, a method for determining a plurality of IDCT result terms for a block within a B-frame "N", in a sequence of video frames including a previous B-frame "N−1", comprising the steps of:

decoding from the compressed video information a plurality of DCT coefficients for the block within B-frame "N";

comparing each of a subset of "M" lowest frequency coefficients of the plurality of DCT coefficients for the block within B-frame "N", with a corresponding one of a subset of "M" lowest frequency coefficients of a plurality of DCT coefficients for a respective block within the previous B-frame "N−1", to generate a corresponding plurality of difference terms;

indicating a first condition when each of the generated plurality of difference terms is less than a corresponding similarity threshold term, and otherwise indicating a second condition;

determining a plurality of IDCT result terms for the block within B-frame "N", upon the first condition, by reusing a plurality of IDCT result terms for the respective block within the previous B-frame "N−1", and conversely upon the second condition, by an IDCT computation using the plurality of DCT coefficients for the block within B-frame "N".

30. A method as in claim 29 wherein each of the similarity threshold terms is set to a single value in common.

31. A method as in claim 29 wherein each of the similarity threshold terms is set to a suitable value selected for a frequency associated with a DCT coefficient corresponding thereto.

32. A method as in claim 30 wherein the single value in common is adaptively adjusted based upon an achieved system frame rate relative to a desired system frame rate.

33. A method as in claim 30 wherein the single value in common is statically selected based upon a target system frame rate.

34. A method as in claim 31 wherein the each of the similarity threshold terms are adaptively adjusted based upon an achieved system frame rate relative to a desired system frame.

35. A method as in claim 29 wherein a value for "M" is adaptively adjusted based upon an achieved system frame rate relative to a desired system frame rate.

36. A method as in claim 29 wherein "M" equals 5.

\* \* \* \* \*